United States Patent Office.

GEORGE W. CATON, OF CANANDAIGUA, NEW YORK.

Letters Patent No. 62,393, dated February 26, 1867.

IMPROVED WATER-PROOF CEMENT.

*The Schedule referred to in these Letters Patent and making part of the same.*

TO ALL WHOM IT MAY CONCERN:

Be it known that I, GEORGE W. CATON, Canandaigua, Ontario county, New York, have invented a new and improved Water-Proof Cement; and I do hereby declare that the following is a full, clear, and exact description thereof, which will enable others skilled in the art to make and use the same.

My improvement consists in combining certain ingredients, hereinafter named, and forming by such combination a water-proof glue or cement, which, for strength and general utility, is unsurpassed. Many water-proof compositions have been devised and tried for cementing leather, crockery, glass, wood, marble, India rubber, &c., but nothing that has been hitherto discovered has been found adapted to all those purposes. My water-proof glue is, and to other purposes not named above.

In carrying out my improvement and forming a perfect article, I do not find it necessary to use what have hitherto been considered indispensable ingredients, viz, India rubber or gutta percha. To form my water-proof glue or cement, I use the following ingredients in the following proportions, viz, one pound ten ounces white-fish glue; twelve ounces white lead; three and one-half pints rain water; one pint alcohol; one-half ounce gum camphor; one-half ounce linseed oil; one-half ounce gum shellac. The water will readily dissolve the fish glue, and the alcohol will dissolve the camphor and gum shellac; and when thus dissolved, the whole of the ingredients are united, forming the water-proof cement, as above described.

What I claim, and desire to secure by Letters Patent, is—

A water-proof glue or cement, composed of the articles above named, and in about the proportions described.

The above specification of my invention signed by me this 26th day of December, 1866.

G. W. CATON.

Witnesses:
    H. M. FIELD,
    J. H. METCALF.